US012576568B2

(12) United States Patent (10) Patent No.: US 12,576,568 B2
Dunne (45) Date of Patent: Mar. 17, 2026

(54) INJECTION MOLDING IN A FLUID SUPPORTED ADDITIVELY MANUFACTURED MOLD

(71) Applicant: 3D Systems, Inc., Rock Hill, SC (US)

(72) Inventor: Patrick Dunne, Lafayette, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 259 days.

(21) Appl. No.: 18/325,300

(22) Filed: May 30, 2023

(65) Prior Publication Data

US 2023/0390984 A1 Dec. 7, 2023

Related U.S. Application Data

(60) Provisional application No. 63/347,678, filed on Jun. 1, 2022.

(51) Int. Cl.
*B29C 45/17* (2006.01)
*B29C 33/38* (2006.01)
*B29C 45/26* (2006.01)
*B33Y 80/00* (2015.01)

(52) U.S. Cl.
CPC ...... *B29C 45/1742* (2013.01); *B29C 33/3842* (2013.01); *B29C 45/26* (2013.01); *B33Y 80/00* (2014.12)

(58) Field of Classification Search
CPC . B29C 33/3842; B29C 45/1742; B29C 45/26; B29C 45/77; B33Y 10/00; B33Y 80/00
See application file for complete search history.

(56) References Cited

U.S. PATENT DOCUMENTS

| | | | | |
|---|---|---|---|---|
| 5,849,339 A | * | 12/1998 | Nakanishi | B29C 44/428 |
| | | | | 264/55 |
| 2014/0277664 A1 | * | 9/2014 | Stump | G06F 30/00 |
| | | | | 700/98 |
| 2019/0263039 A1 | * | 8/2019 | Stagon | B33Y 10/00 |

* cited by examiner

*Primary Examiner* — Xiao S Zhao
*Assistant Examiner* — Victoria Bartlett

(57) ABSTRACT

A manufacturing system includes an additive manufacturing (AM) system and a fluid supported molding system. The AM system is configured to produce a plastic mold. The fluid supported molding system includes a pressure vessel surrounding a pressure chamber. The pressure vessel is configured to contain a fluid surrounding the mold. The fluid supported molding system also includes a mold material injector configured to inject a mold material into the mold. During the injection of mold material into the mold, the fluid surrounding the mold is configured to resist defection of an outer surface of the mold.

8 Claims, 2 Drawing Sheets

INJECTION MOLDING IN A FLUID SUPPORTED ADDITIVELY MANUFACTURED MOLD

FIELD OF THE INVENTION

The present disclosure concerns the manufacture of injection molded articles. More particularly, the present disclosure concerns an apparatus and method for injection molding using additively manufactured molds.

BACKGROUND

Injection molding is a manufacturing process for producing articles through the injection of hot molten plastic into a mold. Typically, molds are formed from metal to withstand high pressures required for the injection process. The molds are very expensive to produce and require many repeated uses to be economical. There is a desire to provide lower volume injection molding processes using customized molds.

SUMMARY

Figure 1:
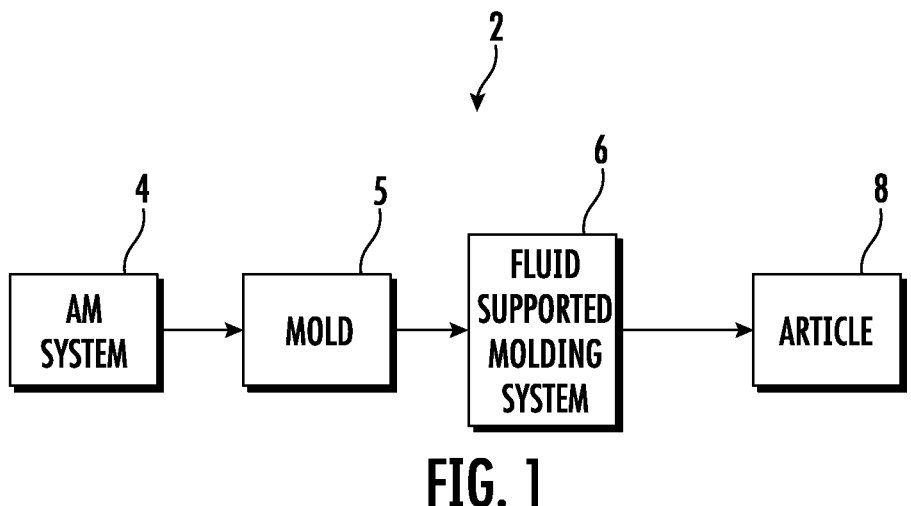
FIG. 1 is a schematic drawing of a manufacturing system including an additive manufacturing system and a fluid supported molding system.

According to a first aspect of the disclosure, a manufacturing system includes an additive manufacturing (AM) system and a fluid supported molding system. The AM system is configured to produce a plastic mold. The fluid supported molding system includes a pressure vessel surrounding a pressure chamber. The pressure vessel is configured to contain a fluid surrounding the mold. The fluid supported molding system also includes a mold material injector configured to inject a mold material into the mold. During the injection of mold material into the mold, the fluid surrounding the mold is configured to resist defection of an outer surface of the mold.

One advantage of the fluid support is to enable use of a mold with a decreased wall thickness. This allows the use of a mold material that can be quickly dissolved in a solvent or in water depending upon the material system. For some systems and materials, it may be possible to use a mold having a wall thickness that is less than 4 millimeters, less than 2 millimeters, or even about 1 millimeter of a polymer material.

In one implementation, the fluid supported molding system includes a fluid injector apparatus that is coupled to the pressure chamber. During injection of mold material into the mold, the fluid injector apparatus is configured to generate a pressure within the fluid surrounding the mold to counteract and resist outward deflection of an outer surface of the mold. The pressure vessel can include a pressure sensor that senses pressure of the fluid surrounding the mold to enable the fluid injector apparatus to provide closed loop pressure control within the pressure chamber. Pressurization by the fluid injector apparatus can by synchronized with pressurization by the mold material injector. The fluid surrounding the mold can be a Newtonian fluid or a hydraulic fluid.

In another implementation, the fluid surrounding the mold can be a non-Newtonian fluid. One non-Newtonian fluid is water with cornstarch. Other non-Newtonian fluids can include silicon polymer based suspensions. Yet other non-Newtonian fluids are known such as non-Newtonian hydraulic fluids.

In yet another implementation, the manufacturing system includes a controller for operating the fluid supported molding system. The controller includes a processor coupled to an information storage device. The information storage device is a non-volatile or non-transient information storage device that stores software instructions. When executed by the processor, the software instructions monitor and control portions of the manufacturing system.

According to a second aspect of the disclosure, a method for manufacturing an article includes additively manufacturing a mold having an outer wall, loading the mold into a pressure chamber, coupling the mold to a material injector, filling the pressure chamber with a support fluid, and operating the material injector to inject a material into the mold. The support fluid contacts the outer wall of the mold and resists deflection of the outer wall of the mold into the chamber. The method of the second aspect of the disclosure can be performed by the system of the first aspect of the disclosure.

In one implementation, the support fluid is a Newtonian fluid. The support fluid can be a hydraulic fluid.

In another implementation, the support fluid is a non-Newtonian fluid. The support fluid can include a water with cornstarch, a silicone polymer based suspension, and/or a polyvinyl alcohol based glue with borax. The support fluid can include a non-Newtonian oil compound such as a non-Newtonian hydraulic fluid. The support fluid can contain oil compounds including poly(alkylmethacrylate) (PMA) and/or poly(ethylene-co-propylene) (OCP).

In yet another implementation, the method can include coupling a fluid injector to the fluid chamber. The method can include operating the fluid injector concurrent with operating the material injector to offset a pressure generated against the outer wall of the mold by the material being injected into the mold. The method can include synchronizing operation of the fluid injector to the material injector. The method can include monitoring a pressure sensor within the pressure chamber and to execute a closed loop control of a pressure within the pressure chamber to balance the pressure generated within the mold.

DETAILED DESCRIPTION OF THE PREFERRED EMBODIMENTS

FIG. 1 is a manufacturing system 2 including an additive manufacturing (AM) system 4 and a fluid supported molding system 6. The additive manufacturing system 4 is configured to produce a plastic mold 5 which is then inserted into the fluid supported molding system 6. Fluid system molding system 6 is operated to produce an injection molded article 8.

The additive manufacturing system 4 can have various embodiments employing one or more known technologies including stereolithography, inkjet dispensing of liquid polymers, and fused deposition modeling, to name a few. All of these technologies are well known and widely used.

Stereolithography utilizes a tank or vessel containing photocurable resin, a motorized build plate, and a radiation-based imaging system. Operation of a stereolithography system is generally as follows: (1) The build plate is positioned with a layer of the photocurable resin between the build plate and the imaging system. (2) The imaging system is operated to selectively harden the layer of the photocurable resin. (3) The build plate is incrementally moved away from the imaging system and a new layer of the photocurable resin is formed over the selectively hardened layer from step (2). (4) The imaging system is operated to selectively harden the new layer of resin. Steps 3 and 4 are repeated until a hollow mold 5 is formed from the photocurable resin. An early patent granted concerning stereolithography is patent U.S. Pat. No. 4,575,330 and many other stereolithography-related patents have issued since.

Positioning the build plate can be accomplished by an operation of a lead screw vertical positioner. The build plate incudes a threaded nut. The lead screw is threaded into the threaded nut and is coupled to a motor. As the motor turns the lead screw, the action of the lead screw upon the threads of the nut vertically translates the build plate. Various vertical positioners such as lead screw systems are known in the art for stereolithography.

The imaging system can include a laser and one or more scanning mirrors. Alternatively, the imaging system can include a DLP micromirror array and a light source. Such imaging systems are known in the art for stereolithography.

Figure 2:
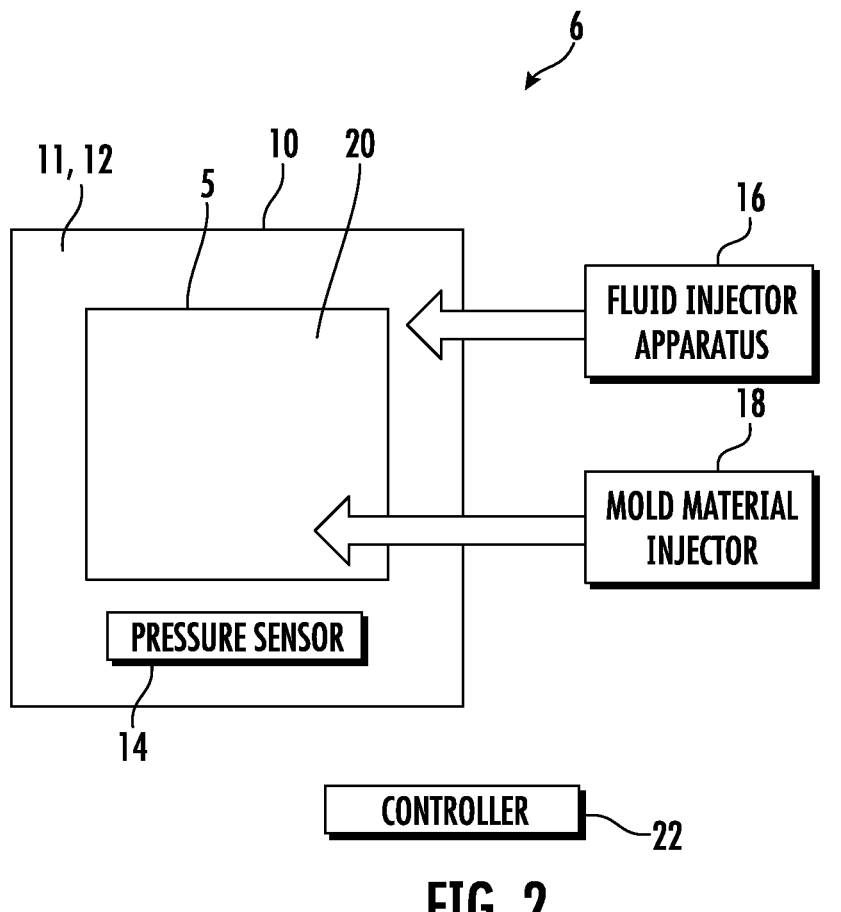
FIG. 2 is a schematic drawing of a fluid supported molding system.

FIG. 2 is a schematic drawing depicting an embodiment of a fluid supported molding system 6. System 6 includes a pressure vessel 10 that is capable of withstanding pressures generated by an injection molding process. In one embodiment pressure vessel 10 includes a steel container with lid having wall thicknesses that are at least about 5 millimeters in thickness. Pressure vessel 10 defines and contains a pressure chamber 11. Pressure vessel 10 can also include an electrically driven resistive heater for controlling a temperature of fluid 12 within the pressure chamber 11.

Illustrated in FIG. 2 is fluid 12 that fills pressure chamber 11 and surrounds the mold 5. Disposed within the pressure chamber 11 is a pressure sensor 14. Pressure sensor 14 is a sensor that outputs a signal indicative of the fluid pressure within pressure chamber 11. In one embodiment, the pressure sensor 14 is a load cell with a piezoelectric crystal. The piezoelectric crystal outputs a voltage signal indicative of a pressure force. The sensor 14 also includes electronics that generate an output signal that is indicative of the pressure force and voltage signal. Such sensors 14 are known in the art for measuring pressures and forces. Other conventional pressure sensors 14 can be used.

A fluid injector apparatus 16 is configured to fill pressure chamber 11 with the fluid 12 and to modulate a pressure of the fluid 12 within the pressure chamber 11. In an illustrative embodiment, the fluid injector apparatus 16 includes a motorized helical fluid drive (helical auger or spiral) disposed within a tube. The helical fluid drive is rotated along a helical axis to either transmit the fluid 12 into the pressure chamber 11 or to modulate the fluid pressure within the pressure chamber 11. The fluid injector apparatus 16 is also configured to heat the fluid 12 as needed. In an illustrative embodiment, the fluid injector apparatus 16 includes an electrically driven resistive heater.

A mold material injector 18 is configured to inject a liquid mold material 20 into the mold 5. Upon entering mold 5, the liquid material 20 cools and solidifies into the article 8. The mold material injector 18 can also be referred to as an injection unit 18 that is similar to an injection unit that is part of an injection molding machine or injection press, both of which are known in the art. In an illustrative embodiment, the injection unit 18 includes an input hopper, a motor-driven screw drive and an electrically driven resistive heater. Plastic pellets are loaded into the input hopper. The motor driven screw drive feeds the pellets past the resistive heater which melts the pellets into molten plastic. The motor drive screw drive also drives the molten plastic into the mold 5.

A controller 22 is configured to monitor and control the fluid supported molding system 6. The controller 22 includes a processor coupled to a non-volatile or non-transient information storage device. The processor can otherwise be referred to as a processing unit (PU) or central processing unit (CPU) as are known in the art of computing technology. The non-volatile or non-transient information storage device can include one or more of flash memory and other mass storage devices such as a magnetic disc drive both of which are known in the art of computing technology.

The additive manufacturing system 4 uses a polymer material to form the mold 5. Polymer materials used in additive manufacturing systems 4 are numerous and widely known. Also known are polymer materials that are water soluble. Alternatively, the polymer materials can be dissolved by another polar or non-polar solvent.

The fluid 12 can includes can be a polar or non-polar fluid. Fluid 12 can be aqueous, polymeric, or a mixture of aqueous and non-aqueous liquids. In a first illustrative embodiment the fluid 12 is a hydraulic fluid. In a second illustrative embodiment the fluid 12 is a non-Newtonian fluid. Use of a non-Newtonian fluid has the advantage that it will resist deflection of outer walls of the mold 5 with less need to modulate pressure within pressure chamber 11. Also, a non-Newtonian fluid can provide support against non-uniform internal pressures.

The liquid mold material can include one or more polymers and/or fillers. Examples of polymers include acrylonitrile butadiene styrene (ABS), polyethylene (PE), polypropylene (PP), polycarbonate (PC), polyamide (PA), polyurethane (PU), polymethacrylate (PMMA/Acrylic), high density polyethylene (HDPE), low density polyethylene (LDPE), polystyrene (PS), PEEK, polyethylene terephthalate (PET), siloxane (silicone or polysiloxane), and other injection moldable polymers known in the art. Fillers can include glass fibers, carbon fibers, glass beads, minerals, flame retardants, and filler materials known in the art. Alternatively, the liquid mold material can be an injection moldable metal material which may be a composite material.

Figure 3:
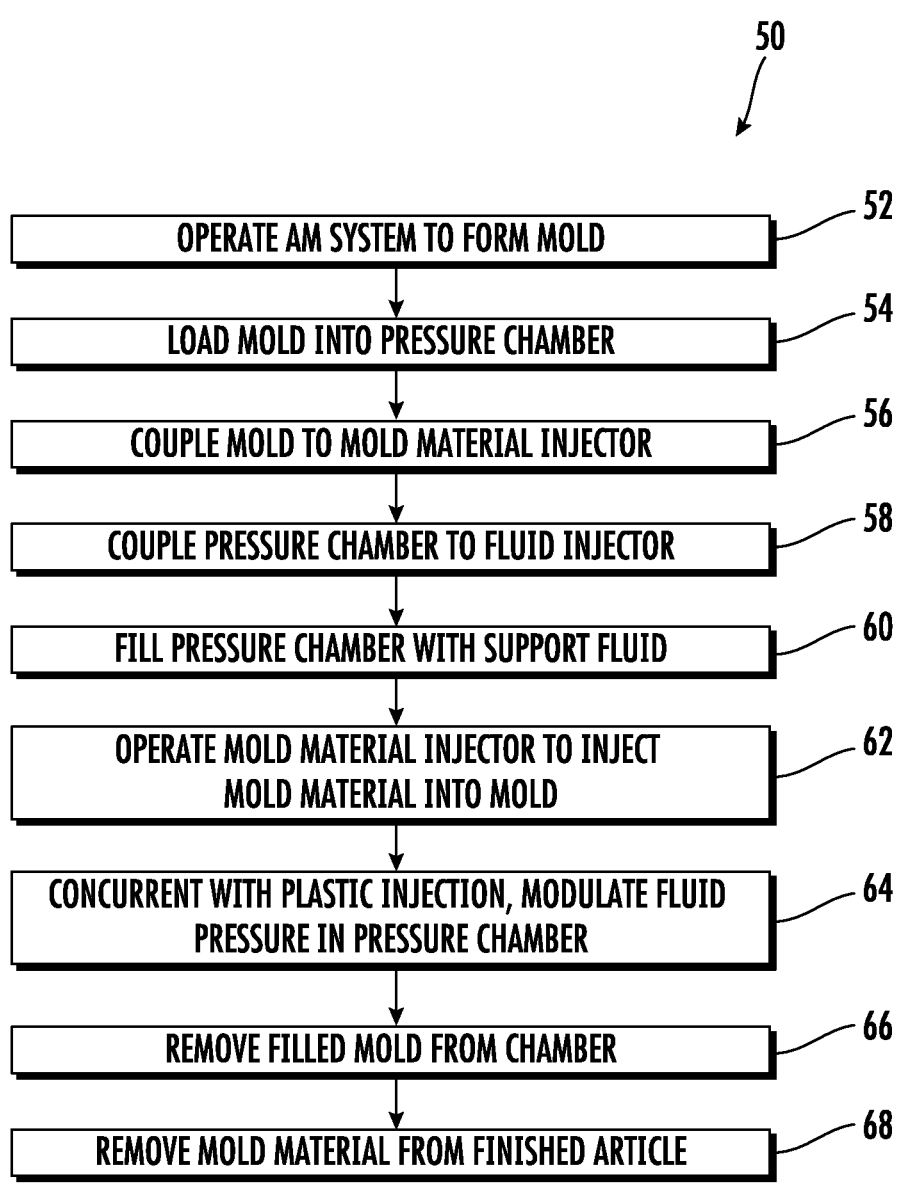
FIG. 3 is a flowchart depicting a method of manufacturing an article.

FIG. 3 is a flowchart of a method 50 for manufacturing or fabricating the article 8. In one embodiment, controller 22 operates components of the system 2 to effect method 50. In some embodiments, certain steps of method 50 can be performed manually.

According to 52, the AM system 4 is operated to fabricate mold 5. According to 54, the mold 5 is loaded into the pressure chamber 11. According to 56, the mold material injector 18 is fluidically coupled to mold 5. According to 58, the fluid injector apparatus 16 is fluidically coupled to the pressure chamber 11. According to 60, the pressure chamber 11 is filled with fluid 12 (support fluid 12).

According to 62, the mold material injector 18 is operated to inject mold material 20 into mold 5. Concurrent with 62 and according to 64, the fluid injector apparatus 16 is operated to modulate the pressure in pressure chamber 11. As part of steps 62 and 64, the controller 22 can receive a signal from the pressure sensor 14 to enable the controller 22 to provide closed loop control of a pressure in pressure chamber 11. Controller 22 can include additional sensors and other hardware to enable synchronization of the pressure exerted within mold 5 to be offset by the pressure in the fluid 12 that surrounds the mold 5.

According to 66, the mold (now filled with mold material 20) is removed from pressure chamber 10. According to 68, the mold 5 material is removed from now fabricated article 8.

The specific embodiments and applications thereof described above are for illustrative purposes only and do not preclude modifications and variations encompassed by the scope of the following claims. For example, the order of steps disclosed with respect to FIG. 3 can vary.

What I claim:

1. A method of manufacturing an article comprising:
   operating an additive manufacturing system to fabricate a hollow mold;
   loading the mold into a pressure chamber;
   sealing the pressure chamber from an outside atmosphere;
   coupling an injection molding system to the hollow mold;
   filling the pressure chamber with a support fluid; and
   operating the injection molding system to inject a hot liquid material into the mold with an injection pressure, the support fluid offsetting the injection pressure exerted by the hot liquid material upon inside surfaces of the mold;
   wherein the support fluid is a non-Newtonian fluid.

2. The method of claim 1 further comprising:
   coupling a fluid injector apparatus to the pressure chamber; and
   concurrent with operating the injection molding system, operating the fluid injector apparatus to dynamically offset and increase a support fluid pressure to dynamically offset the injection pressure.

3. The method of claim 1 further comprising:
   coupling a fluid injector apparatus to the pressure chamber;

sensing a sensed pressure within the pressure chamber; and
   operating the fluid injector apparatus to dynamically respond to a rise the sensed pressure within the pressure chamber.

4. The method of claim 1 wherein the material cools in the mold to form the article and the method further comprising dissolving the mold from the article.

5. A method of manufacturing an article comprising:
   operating an additive manufacturing system to fabricate a hollow mold;
   loading the mold into a pressure chamber;
   sealing the pressure chamber from an outside atmosphere;
   coupling an injection molding system to the hollow mold;
   filling the pressure chamber with a support fluid; and
   operating the injection molding system to inject a hot liquid material into the mold with an injection pressure, the support fluid offsetting the injection pressure exerted by the hot liquid material upon inside surfaces of the mold;
   wherein the support fluid is a hydraulic fluid.

6. The method of claim 5 further comprising: coupling a fluid injector apparatus to the pressure chamber; and concurrent with operating the injection molding system, operating the fluid injector apparatus to dynamically offset and increase a support fluid pressure to dynamically offset the injection pressure.

7. The method of claim 5 further comprising: coupling a fluid injector apparatus to the pressure chamber.

8. The method of claim 5 wherein the material cools in the mold to form the article and the method further comprising dissolving the mold from the article.

* * * * *